United States Patent
Kim et al.

(10) Patent No.: US 8,456,247 B2
(45) Date of Patent: Jun. 4, 2013

(54) MONITORING NEGATIVE BIAS TEMPERATURE INSTABILITY (NBTI) AND/OR POSITIVE BIAS TEMPERATURE INSTABILITY (PBTI)

(75) Inventors: Jae-Joon Kim, Old Tappan, NJ (US); Rahul M. Rao, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 13/009,649

(22) Filed: Jan. 19, 2011

(65) Prior Publication Data
US 2012/0182079 A1 Jul. 19, 2012

(51) Int. Cl.
*H03K 3/03* (2006.01)

(52) U.S. Cl.
USPC ............... 331/57; 331/44; 331/176

(58) Field of Classification Search
USPC ............ 331/44, 57, 176; 324/600, 649
See application file for complete search history.

(56) References Cited

U.S. PATENT DOCUMENTS

| | | | |
|---|---|---|---|
| 6,476,632 B1 | 11/2002 | La Rosa | |
| 6,521,469 B1 | 2/2003 | La Rosa | |
| 6,762,961 B2 | 7/2004 | Eleyan | |
| 7,642,864 B2* | 1/2010 | Chuang et al. | 331/44 |
| 8,154,353 B2* | 4/2012 | Yeric | 331/57 |
| 2003/0214361 A1* | 11/2003 | Nishikido | 331/57 |
| 2008/0180134 A1 | 7/2008 | Jenkins | |
| 2009/0179689 A1 | 7/2009 | Bolam | |
| 2009/0185409 A1 | 7/2009 | Bansal | |
| 2009/0189703 A1 | 7/2009 | Chuang | |
| 2011/0175684 A1* | 7/2011 | Liu | 331/57 |

FOREIGN PATENT DOCUMENTS

| | | |
|---|---|---|
| WO | WO 03/090230 | 10/2003 |
| WO | WO 03/090230 A2 | 10/2003 |

OTHER PUBLICATIONS

Ahmed, F., et al., "Ring Oscillator Based Embedded Structure for Decoupling Pmos/Nmos Degradation with Switching . . .", 2010 IEEE ICMTS P.118-121 Mar. 22-25, 2010.
Jae-Joon Kim, et al. "Ring Oscillator circuit structures for measurement of isolated NBTI/PBTI Effects", 2008 ICICDT, May 18-20, 2008, p. 163-166.
S. Zafar, et. al, "A Comparative Study of NBTI and PBTI (Charge Trapping) in Si02/Hf02 Stacks with FUSI, TiN, Re Gates," Symposium of VLSI Technology, Jun. 2006, p. 23-25.
Jae-Joon Kim, et al "PBTI/NBTI Monitoring Ring Oscillator Circuits with On-Chip Vt Characterization . . ." 2011 Sympos. On VLSI Circuits (VLSIC) Jun. 15-17, 2011, p. 224 - 225.

(Continued)

*Primary Examiner* — Joseph Chang
*Assistant Examiner* — Jeffrey Shin
(74) *Attorney, Agent, or Firm* — Preston J. Young; Otterstedt, Ellenbogen & Kammer, LLP

(57) ABSTRACT

A ring oscillator circuit for measurement of negative bias temperature instability effect and/or positive bias temperature instability effect includes a ring oscillator having first and second rails, and an odd number (at least 3) of repeating circuit structures. Each of the repeating circuit structures in turn includes an input terminal and an output terminal; a first p-type transistor having a gate, a first drain-source terminal coupled to the first rail, and a second drain source terminal selectively coupled to the output terminal; a first n-type transistor having a gate, a first drain-source terminal coupled to the second rail, and a second drain source terminal selectively coupled to the output terminal; and repeating-circuit-structure control circuitry. The ring oscillator circuit also includes a voltage supply and control block.

16 Claims, 12 Drawing Sheets

OTHER PUBLICATIONS

Jae-Joon Kim, et al "Reliability Monitoring Ring Oscillator Structures . . ." Reliability Physics Symposium (Irps), 2011 IEEE International, 10-14 Apr. 2011, p. 2B.4.1-4.

E. Karl, et al "Compact In-Situ Sensors for Monitoring Negative-Bias_Temperature-Instability Effect and Oxide Degradation" IEEE ISSCC 2008 SESSION22 P. 410-411,623 (2008).

Andreas Kerber, et al. "Characterization of Fast Relaxation During BTI Stress . . ." IEEE Transactions on Electron Devices, vol. 55, No. 11, Nov. 2008, p. 3175-3183.

Stephen Ramey et al. "Frequency and Recovery Effects in High-K Bti Degradation" IEEE 47th Annual International ReliabilityPhysics Symposium, Montreal, 2009, p. 1023-1027.

Vijay Reddy et al. "Impact of Negative Bias Temperature Instability .. ."IEEE 40th Annual International ReliabilityPhysics Symposium, Dallas, 2002, p. 248-254.

* cited by examiner

NBTI STRESS CONDITION

PBTI STRESS CONDITION

NBTI DC STRESS
VN + VDD = VDD_stress

PBTI DC STRESS

MEASUREMENT AFTER STOPPING STRESS

MONITORING NEGATIVE BIAS TEMPERATURE INSTABILITY (NBTI) AND/OR POSITIVE BIAS TEMPERATURE INSTABILITY (PBTI)

FIELD OF THE INVENTION

The present invention relates to the electrical and electronic arts, and, more particularly, to techniques for monitoring negative bias temperature instability (NBTI) and/or positive bias temperature instability (PBTI) and the like.

BACKGROUND OF THE INVENTION

Threshold voltage (Vt) increase in metal oxide semiconductor field effect transistors (MOSFETs) due to Bias Temperature Instability (BTI) is a significant reliability concern in high-K (high dielectric constant) metal gate complementary metal oxide semiconductor (CMOS) technologies. P-type metal oxide semiconductor devices (PMOS) are affected by Negative BTI (NBTI) and n-type metal oxide semiconductor devices (NMOS) are affected by Positive BTI (PBTI). FIG. 1 shows a p-type MOSFET 100 with a grounded gate and the left-hand drain-source terminal at voltage VDD, i.e., an NBTI stress condition. FIG. 2 shows an n-type MOSFET 200 with gate at voltage VDD and the left-hand drain-source terminal grounded, i.e., a PBTI stress condition. NBTI leads to PMOS Vt degradation and PBTI leads to NMOS Vt degradation.

Until recently, NBTI was considered to be more severe than the corresponding PBTI (PBTI has a negligible effect in NMOS with poly gates). However, with the use of metal-gates and high-K gate dielectrics, PBTI is becoming an equally important concern. With reference to FIG. 3, a typical ring oscillator structure (RO) 300 has been used as a popular NBTI monitoring circuit for its simplicity. Alternate stages experience different input voltage (either GND or Vstr) and hence NBTI and PBTI effects cannot be separated from RO output frequency degradation since RO frequency degradation after stress is due to both NBTI and PBTI. Such ring oscillator structures can be used when one BTI mechanism (PBTI or NBTI) is negligible compared to the other (NBTI or PBTI respectively) since the output frequency of the ring oscillator depends on both NBTI and PBTI degradation. The frequency of ring oscillator 300 is measured before stress. In stress mode, the ring is disabled from oscillation and the supply voltage and/or temperature are increased (e.g., Vdd raised to Vdd_stress) to facilitate an accelerated stressing of the devices. Since PBTI has been considered insignificant, the impact of stress on the NFETs 308 has been ignored. After suitably stressing the ring-oscillator circuit 300, its frequency is measured again (with Vdd back to normal), and the difference in the pre- and post-stress frequencies is a direct indication of the extent of NBTI related degradation of the PFET devices 306 in the circuit. Note that circles 306 indicate PMOS devices under stress while circle 308 indicates an NMOS device under stress. Note also that the connection between output 310 and input 312 is omitted for clarity, and that transistors are referred to herein generically as devices.

Co-assigned U.S. Pat. No. 7,642,864 of Chuang et al. discloses circuits and design structures for monitoring NBTI (negative bias temperature instability) effect and/or PBTI (positive bias temperature instability) effect. A ring oscillator has an odd number of NOR-gates greater than or equal to three, each with first and second input terminals, a voltage supply terminal, and an output terminal. The first input terminals of all the NOR-gates are interconnected, and each of the NOR-gates has its output terminal connected to the second input terminal of an immediately adjacent one of the NOR-gates. During a stress mode, a voltage supply and control block applies a stress enable signal to the interconnected first input terminals, and an increased supply voltage to the voltage supply terminals. During a measurement mode, this block grounds the interconnected first input terminals, and applies a normal supply voltage to the voltage supply terminals. One or more embodiments of the Chuang et al. invention advantageously separate out the NBTI and PBTI effects while maintaining simplicity of the circuit structure.

With reference to FIG. 4, in one or more embodiments of the invention of Chuang et al., PBTI and NBTI measurement systems are combined into a single ring-oscillator system 400 (which replaces an inverter), using a two-high stack for both PFET and NFET devices, with parallel PFET and NFET devices 410, 412 that ensure the application of appropriate stress voltages to the devices under test (DUTs) in stress mode. The repeating circuit structure 400 includes stacked PMOS device under test 402 and PMOS PB 404, as well as stacked NMOS NB 406 and NMOS device under test 408. N0 414 is the input and N1 416 is the output. The top and bottom rails are numbered, respectively, 418, 420. The extra devices used to provide isolation functionality are referred to as repeating-circuit-structure control circuitry, for example, devices 404, 406, 410, 412 (similar nomenclature is used for devices 504, 506, 510, 512 discussed below). The gates of all devices 404 may be interconnected to a p-stress enable terminal, the gates of all devices 406 may be interconnected to an n-stress enable terminal, the gates of all devices 410 may be connected to a p-parallel terminal, and the gates of all devices 412 may be connected to an n-parallel terminal.

In NBTI DC stress mode input 414 is grounded and the elevated stress voltage is applied to the top rail 418 and the gates of devices 404, 410, 412. Bottom rail 420 is also grounded (ground symbols in FIG. 4 represent this condition), as is the gate of device 406. This results in a ground appearing also on output 416, with devices 404, 406, 408, 410 off and device 402 stressed. The ground at 416 will also result in stressing the next PMOS device 402 in the next repeating structure 400.

In the device of FIG. 4, the gate voltage of PDUT 402 and NDUT 408 is in common, and the gate voltage of the DUTs is driven by the previous stage.

Further details re the PBTI stress mode and the measurement mode are provided in the aforesaid U.S. Pat. No. 7,642,864.

SUMMARY OF THE INVENTION

Principles of the invention provide techniques for monitoring negative bias temperature instability (NBTI) and/or positive bias temperature instability (PBTI). In one aspect, an exemplary ring oscillator circuit, for measurement of at least one of negative bias temperature instability effect and positive bias temperature instability effect, includes a ring oscillator having first and second rails, and an odd number of repeating circuit structures, the odd number being at least three. Each of the repeating circuit structures in turn includes an input terminal and an output terminal; a first p-type transistor having a gate, a first drain-source terminal coupled to the first rail, and a second drain source terminal selectively coupled to the output terminal; a first n-type transistor having a gate, a first drain-source terminal coupled to the second rail, and a second drain source terminal selectively coupled to the output terminal; and repeating-circuit-structure control circuitry. Each of the repeating circuit structures has its output terminal connected to the input terminal of an immediately adjacent one of the repeating circuit structures. The ring oscillator circuit also includes a voltage supply and control block coupled to the ring oscillator and configured to cooperate with the repeating-circuit-structure control circuitry such that: (i) during a negative bias temperature instability effect direct current stress mode, the gates of the first n-type transistors are grounded to turn them off, a stress voltage differential is applied between the first rail and the gates of the first p-type transistors to stress them, and the second rail is grounded; (ii) during a positive bias temperature instability effect direct current stress mode, the gates of the first p-type transistors are held at a nominal supply voltage to turn them off, a stress voltage differential is applied between the second rail and the gates of the first n-type transistors to stress them, and the first rail is held at the nominal supply voltage; and (iii) during a measurement mode, the nominal supply voltage is applied to the first rail and a ground to the second rail, and the second drain source terminals of the first n-type transistors and the first p-type transistors are coupled to the output terminals, such that each of the repeating circuit structures functions as an inverter.

In another aspect, an exemplary method includes providing a ring oscillator of the kind described; during a negative bias temperature instability effect direct current stress mode, grounding the gates of the first n-type transistors to turn them off, applying a stress voltage differential between the first rail and the gates of the first p-type transistors to stress them, and grounding the second rail; during a positive bias temperature instability effect direct current stress mode, holding the gates of the first p-type transistors at a nominal supply voltage to turn them off, applying a stress voltage differential between the second rail and the gates of the first n-type transistors to stress them, and holding the first rail at the nominal supply voltage; and during a measurement mode, applying the nominal supply voltage to the first rail and a ground to the second rail, and coupling the second drain source terminals of the first n-type transistors and the first p-type transistors to the output terminals, such that each of the repeating circuit structures functions as an inverter.

In still another aspect, design structures directed to circuits of the kind described and/or portions thereof are provided.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

In still another aspect, the invention includes design structures for circuits of the kind described.

One or more embodiments of the present invention may be realized in the form of an integrated circuit.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

One or more embodiments provide a new ring oscillator (RO) structure to monitor NBTI and PBTI effects separately. In addition, the unique circuit topology of one or more embodiments makes it possible to directly correlate the RO frequency degradation to transistor threshold voltage (Vt) degradation without relying on compact modeling with device parameters extracted from transistor-level measurements. Furthermore, one or more embodiments enable high-speed (>GHz) AC BTI stress experiments with accompanying on-chip AC stress circuitry. The validity of the circuit concept has been confirmed by non-limiting exemplary measurements from a test chip in a high-K/metal gate silicon-on-insulator (SOI) CMOS technology.

Figure 1:
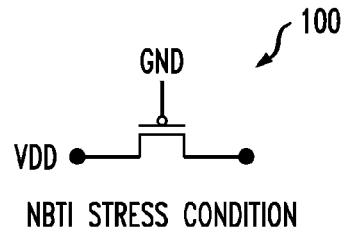
FIG. 1 shows an NBTI stress condition, as known in the prior art.
Figure 2:
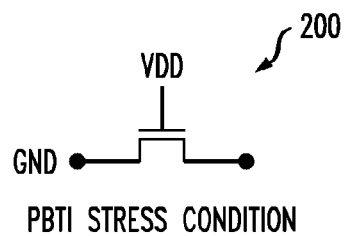
FIG. 2 shows a PBTI stress condition, as known in the prior art.
Figure 3:
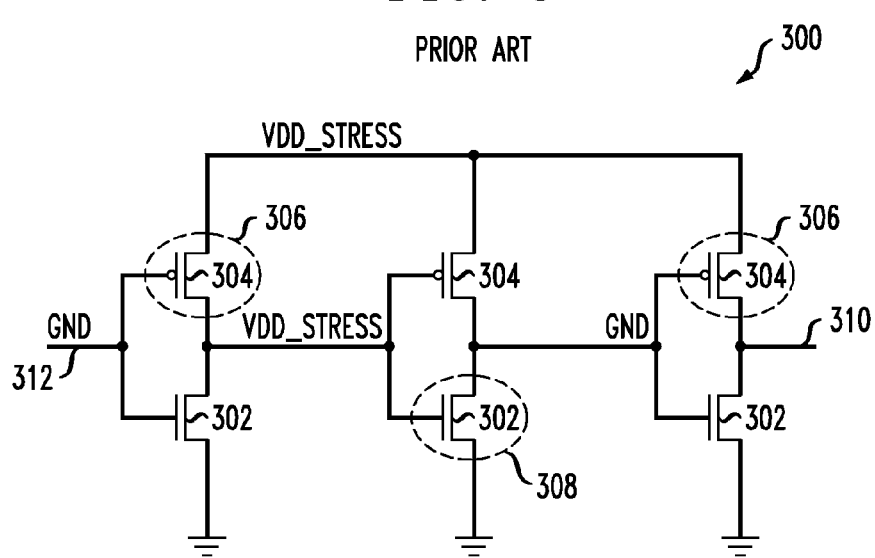
FIG. 3 shows a ring oscillator, as known from the prior art.

As noted above, Negative/Positive Bias Temperature Instability (N/PBTI) stress is a significant reliability issue in scaled CMOS technologies. Conventional RO structures as in FIG. 3 have been widely used as NBTI monitoring circuits due to their simplicity. However, they are used only when PBTI is negligible compared to NBTI since the frequency of the RO depends on degradation due to both NBTI and PBTI. In the arrangement of FIG. 3, in DC stress mode, half of the stages of a conventional RO experience NBTI stress while the rest experience PBTI stress since the output of each stage is a logical inversion of the input and it drives the input of the next stage.

As also noted above, co-assigned U.S. Pat. No. 7,642,864 of Chuang et al. discloses circuits and design structures for monitoring NBTI (negative bias temperature instability) effect and/or PBTI (positive bias temperature instability) effect; one of more embodiments of the Chuang et al. invention advantageously separate out the NBTI and PBTI effects while maintaining simplicity of the circuit structure.

Advantageously, unlike prior art techniques, one or more embodiments of the invention permit direct extraction of the Vt degradation from the RO frequency degradation measurement, without need for simulations based on compact models extracted from device measurement; this avoids potential inaccuracy when the real device parameters differ from the compact modeling parameters due to process variations. Furthermore, advantageously, unlike prior art techniques, one or more embodiments allow application of high speed AC stress, which typically cannot be applied to prior art circuits since AC stress is carried out by pulsing the supply voltage or ground line, both of which have a large capacitance. One or more embodiments provide a new RO structure which allows on-chip Vt characterization and high-speed AC stress. One or more embodiments merge the blocking and inverter function disclosed in the Chuang et al. patent together to free up the gate node of the DUT for external control input, advantageously allowing application of AC stress to the gate while maintaining NBTI vs. PBTI isolation and allowing application of an external control voltage for Vt characterization.

Figure 4:
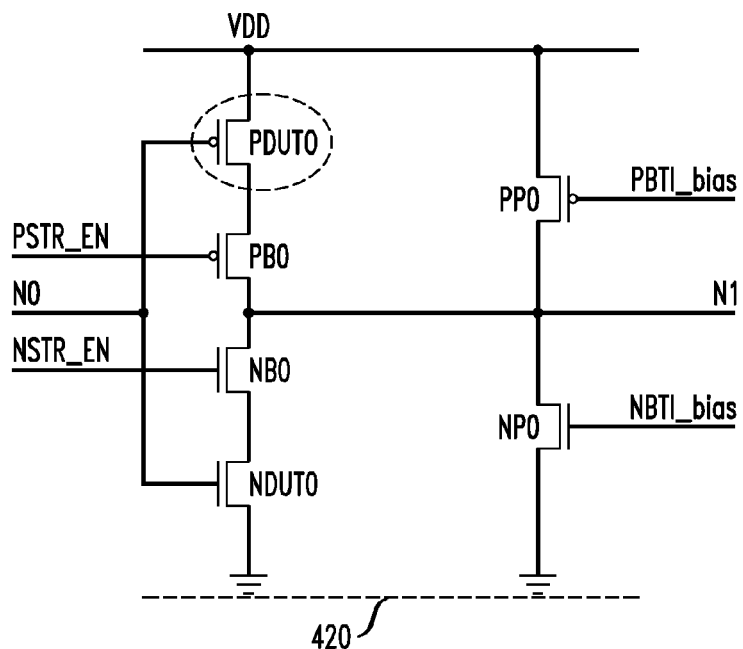
FIG. 4 depicts a repeating unit that can be used for both NBTI and PBTI measurement, as known from the prior art.
Figure 5A:
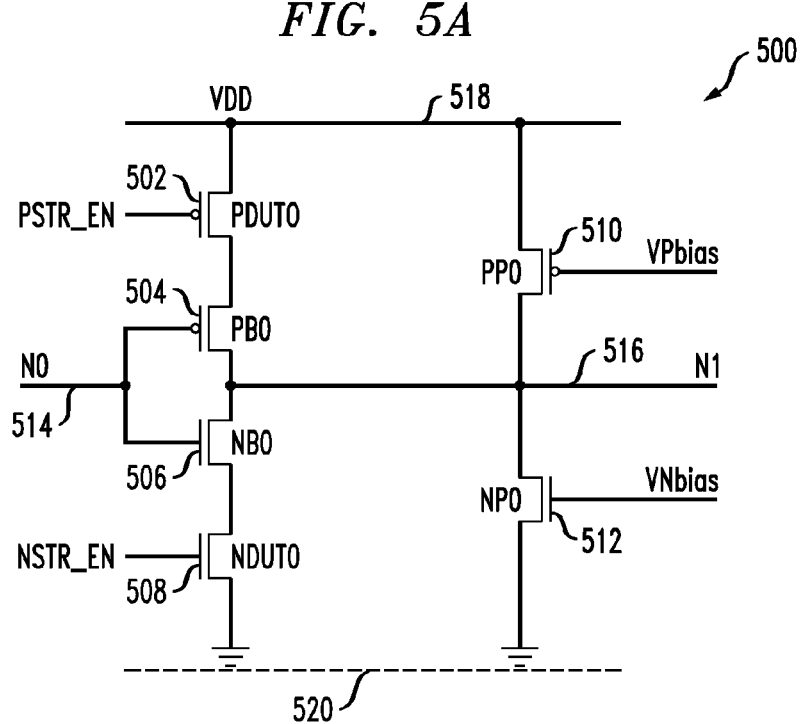
FIG. 5A depicts a single stage of a ring oscillator, according to an aspect of the invention.

The correlation between Vt and frequency degradation can be mapped if the RO frequency can be pre-characterized as a function of the gate voltage of the device-under-test (DUT) and a lookup table (LUT) can be made. In the prior art design of FIG. 4, the gate input N0 of the DUTs 402, 408 in each stage is driven by the output of the previous stage (e.g., 416 of a previous stage), making it impossible to control the gate voltage externally for characterization. In contrast, as seen in FIG. 5A, one or more embodiments (see example 500) allow the gate input of each DUT to be controlled by an external stress voltage. Elements in FIG. 5A analogous to those in FIG. 4 have received the same reference character incremented by 100. In particular, p-type DUT 502 has an independent gate which can have signal PSTR_EN applied thereto while n-type DUT 508 has an independent gate which can have signal NSTR_EN applied thereto. The correlation between Vt degradation and frequency degradation can thus be mapped by sweeping the gate voltage of devices under test (DUT) and recording the corresponding ring oscillator frequency before stress.

Figure 5B:
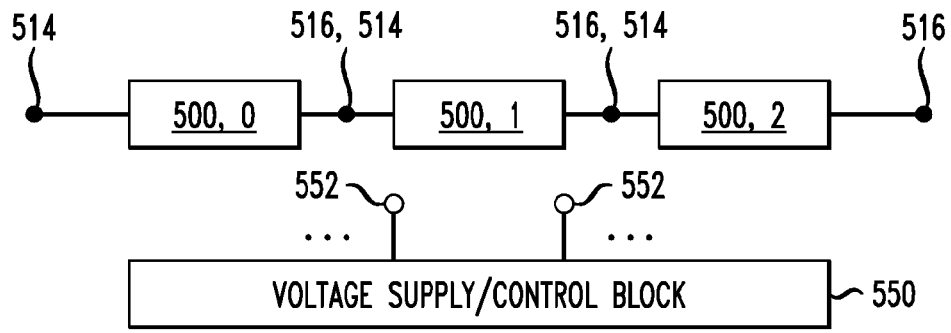
FIG. 5B is a block diagram of a three-stage ring oscillator using stages as depicted in FIG. 5A.

With reference to FIG. 5B, an odd number of stages 500 should be serially connected (output of one stage 516 connected to input 514 of next stage) to form a complete ring oscillator. Note that while FIG. 5B schematically depicts three stages numbered 500,0; 500,1; and 500,2, any odd number greater than or equal to three can be employed. Note also that feedback from the last stage's output to the first stage's input is not shown, for illustrative convenience. Also shown in FIG. 5B is voltage supply/control block 550 with a plurality of terminals 552. Block 550 is coupled to the circuit with stage 500, as suggested by the ellipses, and applies the correct voltages to each terminal for stress, measurement, and so on. Each circuit depicted herein can be provided with a similar voltage supply/control block, but such block is omitted from the remainder of the figures for brevity and illustrative convenience.

Block 550 can be implemented in a number of different fashions. In some instances, employ hardware specific circuitry to apply the correct voltages at the correct time. Given the teachings herein about what voltages to apply at what times, the skilled artisan can construct a suitable hardware control block including a counter block, programmable registers and comparators, and a simple decode logic. In other cases, employ software code to control one or more processors which in turn control a voltage supply to periodically carry out stressing and measuring. Other cases may use a mixture of hardware and software techniques. Thus, outside circuitry, on-chip circuitry, embedded programs, and the like can be employed in different embodiments; for example, to carry out steps such as those depicted in FIG. 10 or corresponding steps for PDUT.

With continued reference to FIG. 5A, note two-high stack for both PFET (502, 504) and NFET (506, 508) devices, with parallel PFET and NFET devices 510, 512. The repeating circuit structure 500 includes stacked PMOS device under test 502 and PMOS PB 504, as well as stacked NMOS NB 506 and NMOS device under test 508. N0 514 is the input and N1 516 is the output (and input to the next stage). The top and bottom rails are numbered, respectively, 518, 520.

Figure 6:
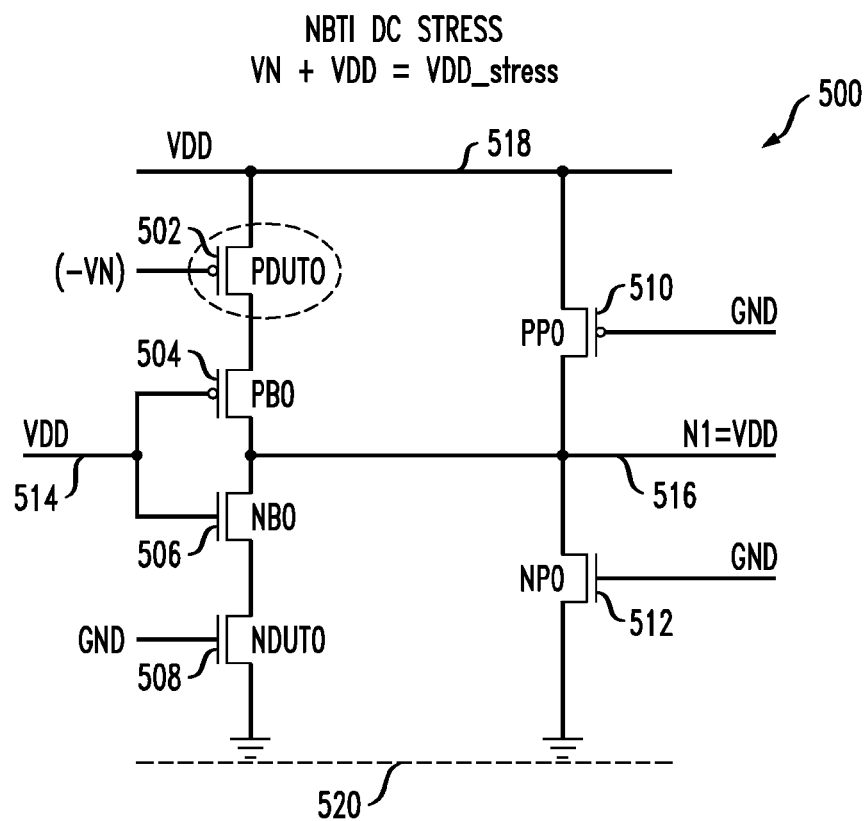
FIG. 6 depicts an NBTI-only stress mode of the inventive circuit of FIG. 5A.

The operating principles of the circuit 500 are as follows. For NBTI measurement, one requirement is to isolate the PMOS devices under stress mode. In NBTI stress mode, as shown in FIG. 6, the following conditions are applied to each RO stage to isolate and stress the PMOS DUTs 502:

NSTR_EN=GND,

VPbias=GND,

VNbias=GND.

This turns PP 510 on and NP 512 off thereby charging the output node 516 of each stage (and thereby also the input of each stage since the output of one stage is connected to the input of the next) to VDD, which turns PB 504 off and NB 506 on. Even though NB 506 is on, it does not experience PBTI stress since NDUT 508 is turned off (due to GND gate input) and hence the gate to source (drain) voltage of NB 506 is very low. As a result, PB 504, NB 506, and NDUT 508 do not experience BTI stress while PDUT 502 experiences NBTI stress when a negative voltage −VN (VN+VDD=desired Vstr) is applied to its gate. Instead of applying the negative voltage to the gate of PDUT 502 with nominal VDD supply voltage, the gate input can be tied to GND while elevating the supply voltage to Vstr. Some embodiments use the former approach to achieve a faster transition from stress mode to measurement mode. PP 510 experiences NBTI stress but it is turned off during the measurement and hence does not contribute to the RO frequency degradation.

Figure 7:
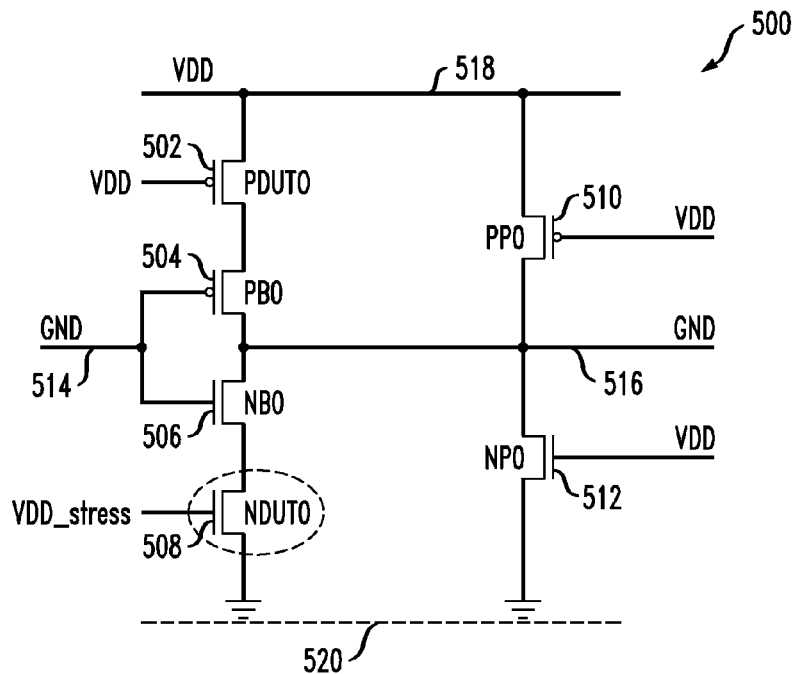
FIG. 7 depicts a PBTI-only stress mode of the inventive circuit of FIG. 5A.

The PBTI stress condition can be explained in the complementary fashion, with reference to FIG. 7. In particular, apply:

PSTR_EN=VDD,

VPbias=VDD,

VNbias=VDD.

Under this condition, the output voltage of each stage is conditioned to GND and, as a result, NB0 506 and PDUT0 502 are turned off to isolate NMOS DUT (NDUT0) 508 in each stage. DC stress voltage VDD_stress can be applied to the gate of NDUT0 508.

Figure 8:
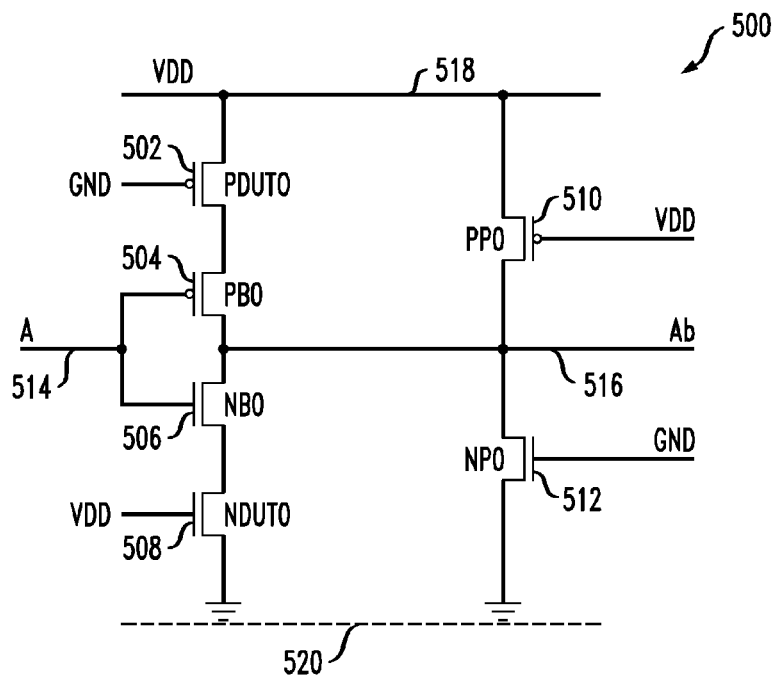
FIG. 8 depicts a measurement mode of the inventive circuit of FIG. 5A.

In the measurement mode, as seen in FIG. 8, appropriate conditions are applied to each RO stage such that ring oscillation can occur. In particular,

PSTR_EN=GND,

NSTR_EN=VDD,

VPbias=VDD,

VNbias=GND.

Under such conditions, both PDUT 502 and NDUT 508 are turned on and PP and NP 510, 512 are turned off so that each stage of the RO becomes logically equivalent to an inverter.

Advantageously, one or more embodiments can directly correlate the Vt degradation in the DUT to the degradation in the RO output frequency from the same circuit measurement.

Figure 9:
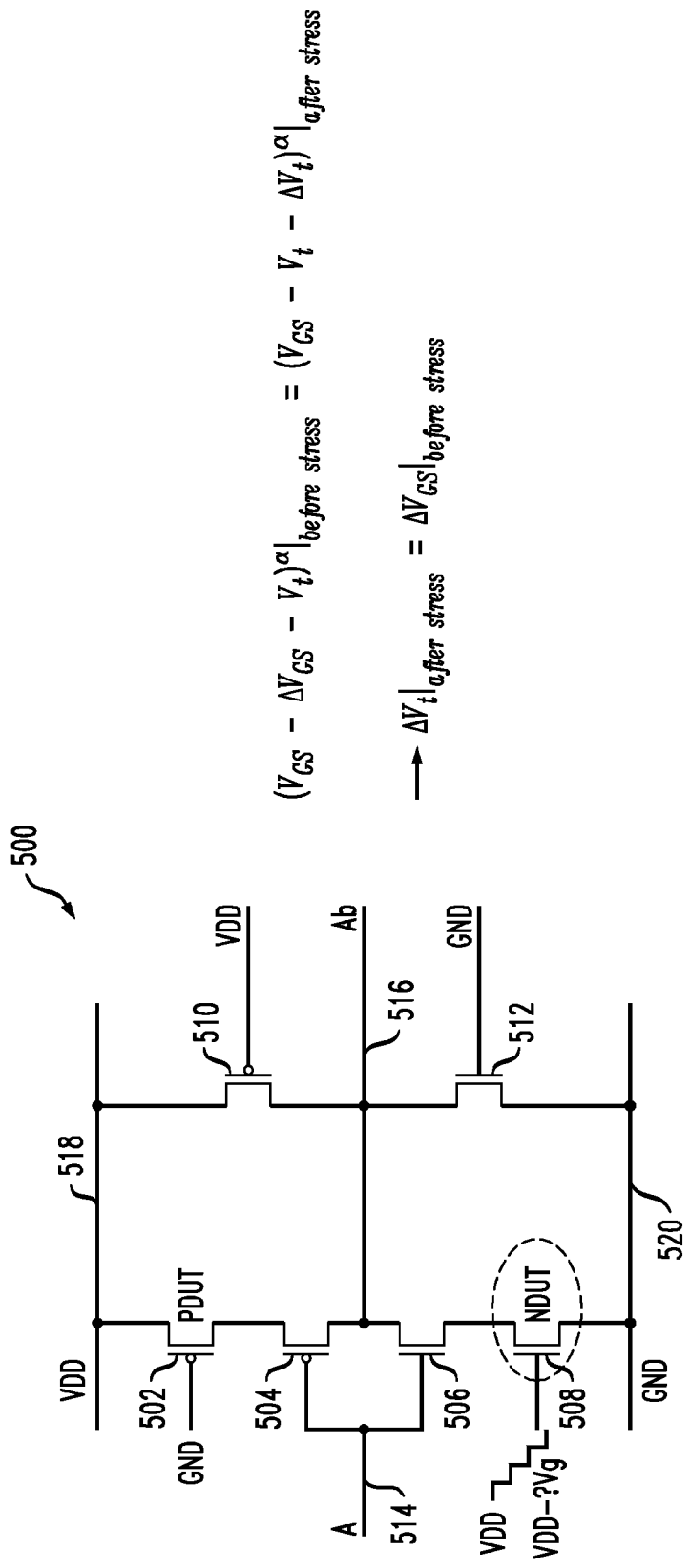
FIG. 9 depicts Delta Vt vs. RO frequency characterization for a PBTI stress case for the inventive circuit of FIG. 5A.

Since the gate terminal of each DUT 502, 508 can be independently controlled, it is possible to characterize the RO frequency as a function of changes in gate voltage before stress as shown in FIG. 9. This can then be used to estimate the Vt degradation for a measured RO frequency degradation directly. In particular, for ΔVt vs. RO frequency characterization for the PBTI stress case, if the RO frequency after stress is the same as the RO frequency at the Vg=Vg1 in the characterization mode before stress, take the ΔVg as the ΔVt after the stress (PDUT is characterized for the NBTI case).

Figure 10:
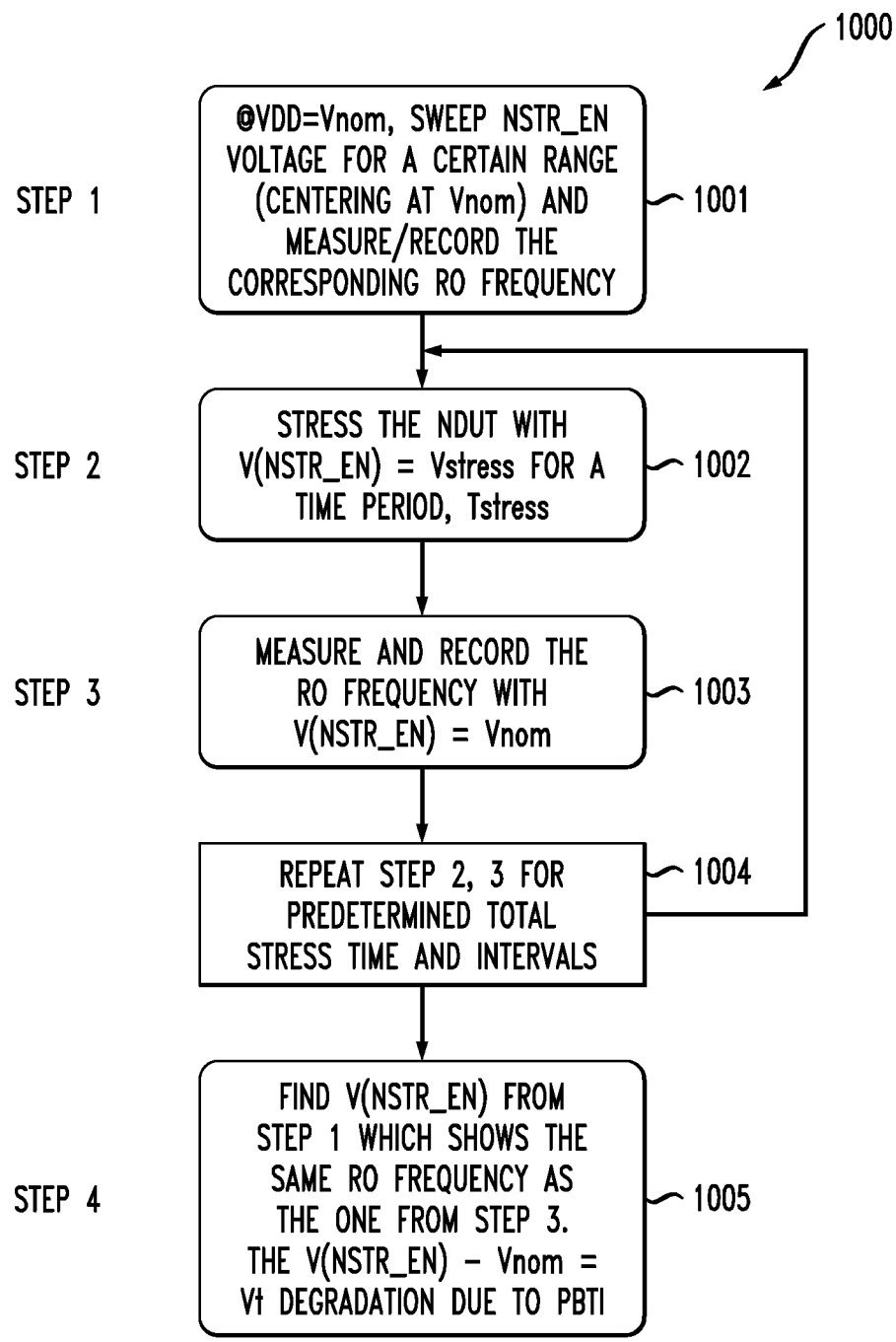
FIG. 10 depicts a flow chart of Delta Vt vs. RO frequency characterization for a PBTI stress case for the inventive circuit of FIG. 5A.

FIG. 10 presents a flow chart 1000 for delta Vt versus delta RO frequency characterization. In step 1, numbered 1001, at VDD=Vnom, sweep NSTR_EN voltage for a certain range (centering at Vnom) and measure and record the corresponding RO frequency. In step 2, numbered 1002, stress the NDUT with V(NSTR_EN)=Vstress for a time period Tstress. In step 3, numbered 1003, measure and record the RO frequency with V(NSTR_EN)=Vnom. In decision block 1004, determine whether predetermined total stress time and intervals are complete; if not, repeat steps 2 and 3 for the predetermined total stress time and intervals; if so, proceed to step 4, numbered 1005, and find the V(NSTR_EN) from step 1 which shows the same RO frequency as the one from step 3. Then, V(NSTR_EN)−Vnom=Vt degradation due to PBTI.

NBTI characterization is carried out analogously (i.e., cycling PSTR-EN).

To summarize, for the NBTI case, sweep the gate voltage of PDUT0 502 in the measurement mode and record the corresponding RO output frequency. After performing the stress test, compare the RO output frequency from the stress test and find the corresponding Vgate(PDUT0) from the Vgate(PDUT0) versus RO frequency table that was made in the characterization mode. The difference between Vgate(PDUT0) in the stress test and the characterization for the same RO frequency is the amount of Vt degradation due to NBTI. In the PBTI case, sweep the gate voltage of NDUT0 508 in the characterization mode and record the results similar to the NBTI case. The Vt degradation due to PBTI can be found from comparison between RO frequency from the stress test and characterization table.

Figure 11A:
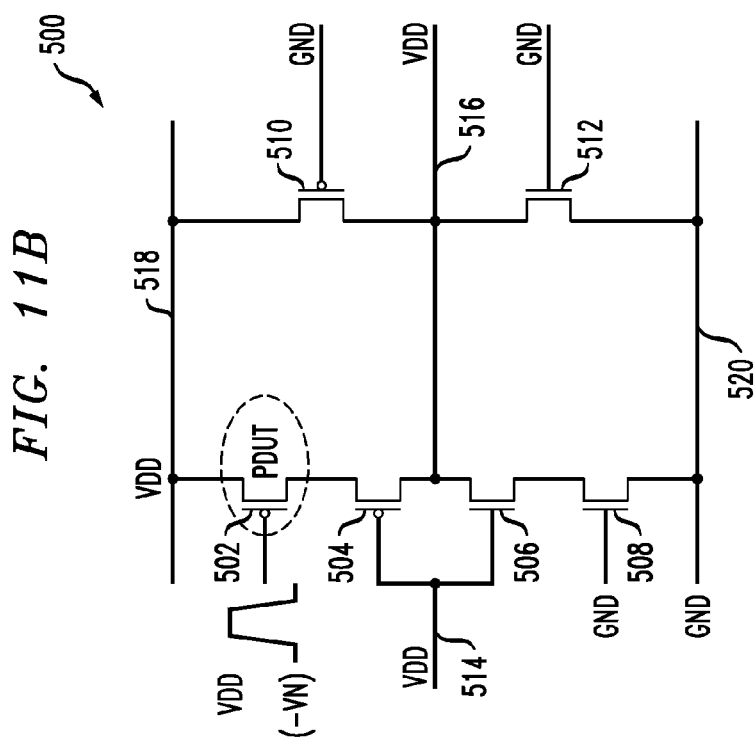
FIGS. 11A and 11B show NBTI AC stress comparison between certain techniques disclosed in U.S. Pat. No. 7,642,864 (FIG. 11A) and certain techniques in accordance with aspects of the invention (FIG. 11B); in the PBTI case, the ground line is pulsed for the left-hand configuration and the gate of NDUT is pulsed for the right-hand configuration.
Figure 11B:
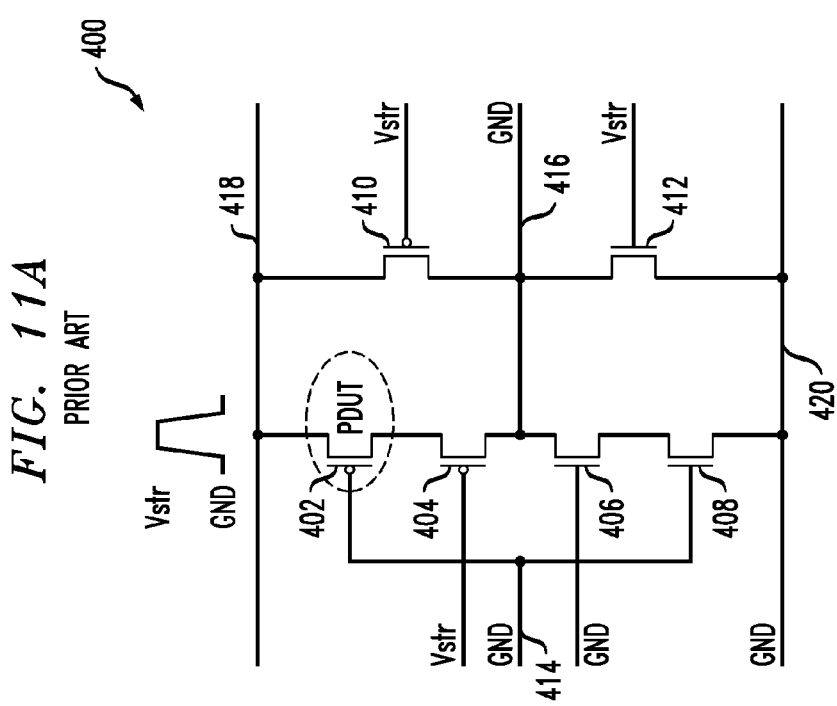

Another advantage of one or more embodiments is the enablement of high-speed AC stress. As shown in FIG. 11A (circuit of FIG. 4), in previous schemes, the gate of the DUT (here, PDUT 402) cannot be pulsed since NMOS and PMOS are stressed alternately. Hence, the power supply needs to be pulsed for AC NBTI stress and the ground needs to be pulsed for AC PBTI stress. The large capacitance of the power supply or ground line hinders high frequency pulsing so that only low frequency AC stress is typically possible in the configuration of FIG. 11A. As seen in FIG. 11B (circuit of FIG. 5A), advantageously, in one or more embodiments, high frequency AC stress can be easily applied since only the gates of the DUTs 502, 508 need to be pulsed, and thus only the gate capacitance is a factor, making high-speed AC stress possible. Thus, in one more embodiments, high-frequency AC stress is applied at a frequency of at least 20 MHz; in other cases, at least 1 GHz; in further cases, at least 5 GHz; in even further cases, at least 10 GHz; or in still further cases, at least 20 GHz.

One or more embodiments thus allow measurement of NBTI and PBTI separately while maintaining the simplicity of RO type measurement; direct correlation between Vt degradation and RO frequency degradation and/or high speed AC stress are possible in one or more embodiments. The high speed AC stress can be supplied by an on-chip source and/or an external source.

Non-Limiting Exemplary Test Chip Design and Measurement Results

Figure 12:
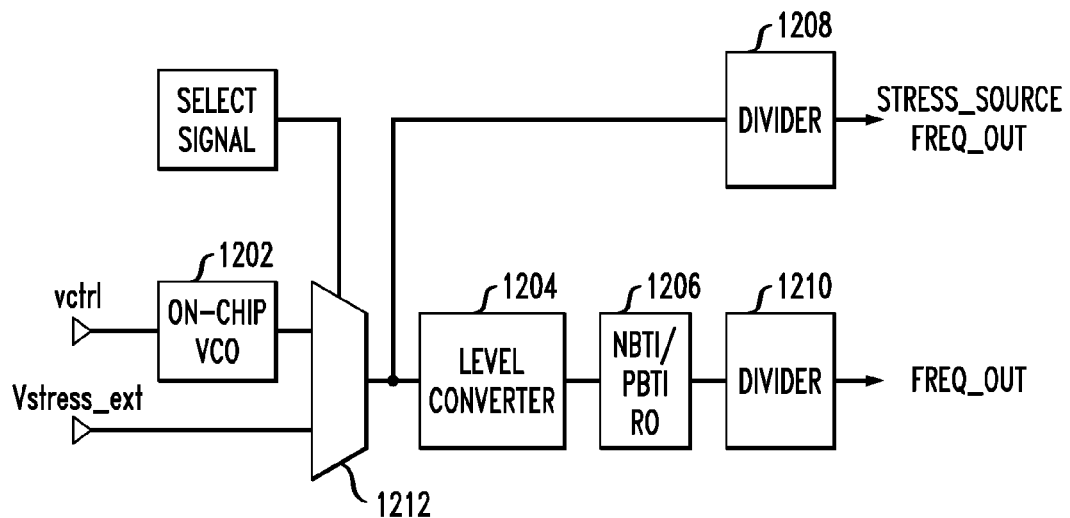
FIG. 12 shows a BTI monitor block diagram with an on-chip AC/DC stress circuit, according to another aspect of the invention.

A test chip was implemented for experimental purposes in a high-K/metal gate SOI CMOS technology. For each of the NBTI-only and PBTI-only ROs, two types of structures were implemented. The first one had a single DUT and the other two had two serially connected DUT transistors (stacked DUTs). With reference to FIG. 12, the design included an on-chip VCO 1202 to generate high-speed (>GHz) pulses and level converters 1204 to apply suitable stress voltages for each BTI RO 1206. The VCO frequency was externally observable (after a division by 128; note dividers 1208, 1210) and hence the requirement for the linearity of VCO was not stringent. Note the presence of a 2:1 multiplexer 1212 which allows the selection between the output of the on-chip VCO or an external stress signal under control of the select signal.

The on-chip VCO 1202 is controlled by control voltage vctrl which can be used to adjust the frequency of the VCO 1202. Multiplexer 1212 makes provision for use of external stress Vstress_ext; for example, in case of failure of the on-chip VCO. External stress may be limited to frequencies of less than about 100 MHz in at least some instances. Divider 1208 is optional and just divides the output of multiplexer 1212 and makes it available on a pad for viewing on an oscilloscope (the division facilitates oscilloscope display and in a non-limiting embodiment division is by a factor of 128). Level converter 1204 shifts voltages as needed (for example from VDD to Vstress). Block 1206 includes 3 or more stages 500 (an odd number thereof). Optional divider 1210 just divides the output of block 1206 and makes it available on a pad for viewing on an oscilloscope (the division facilitates oscilloscope display and in a non-limiting embodiment division is by a factor of 128).

Thus, the top path with divider 1208 is employed for characterization of the VCO or external source while the bottom path with blocks 1204, 1206, 1210 is where the degradation due to BTI is determined using aspects of the invention.

Figure 14:
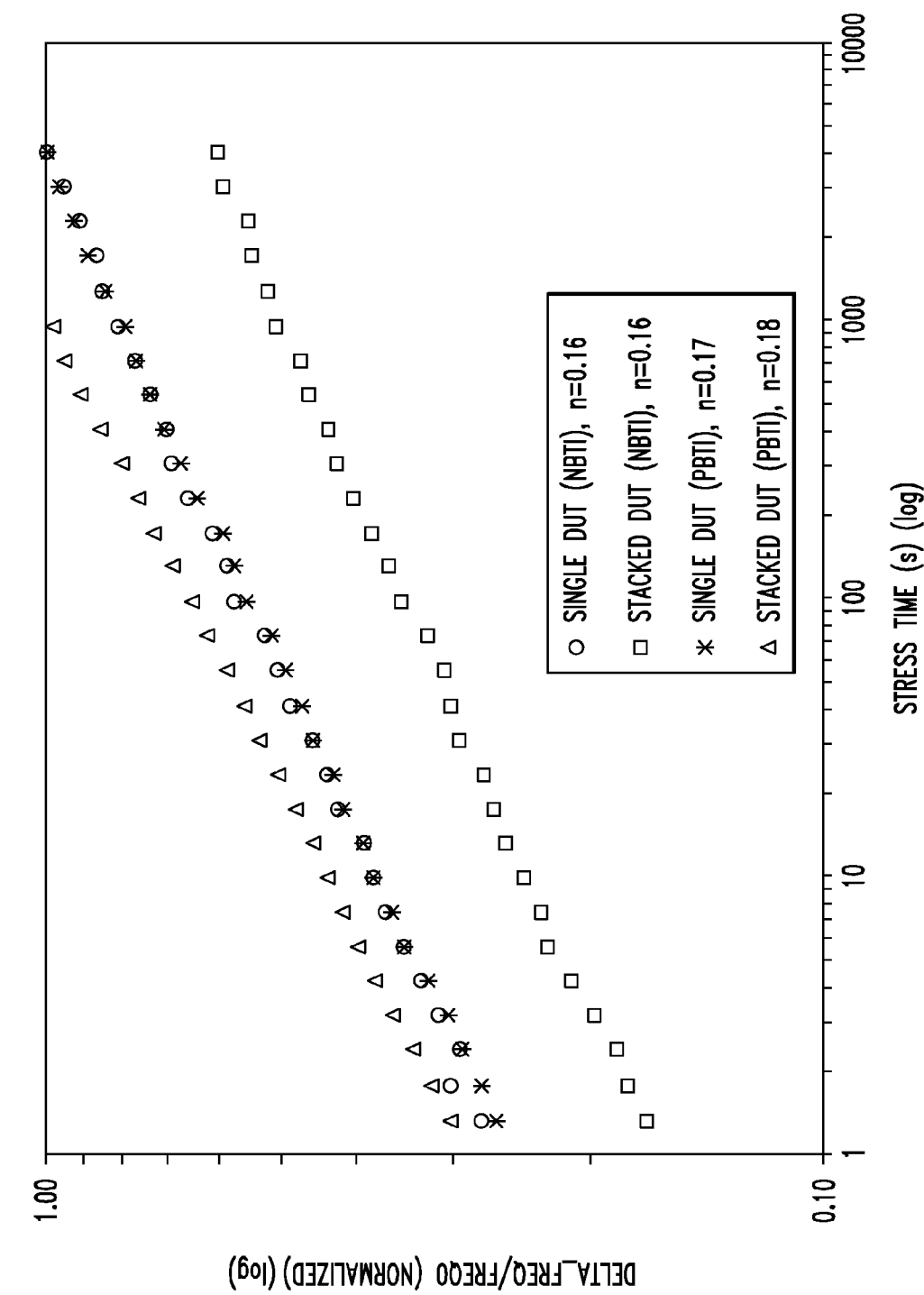
FIG. 14 shows exemplary data for stress time vs. RO frequency degradation ($\Delta f/f0$)
Figure 15:
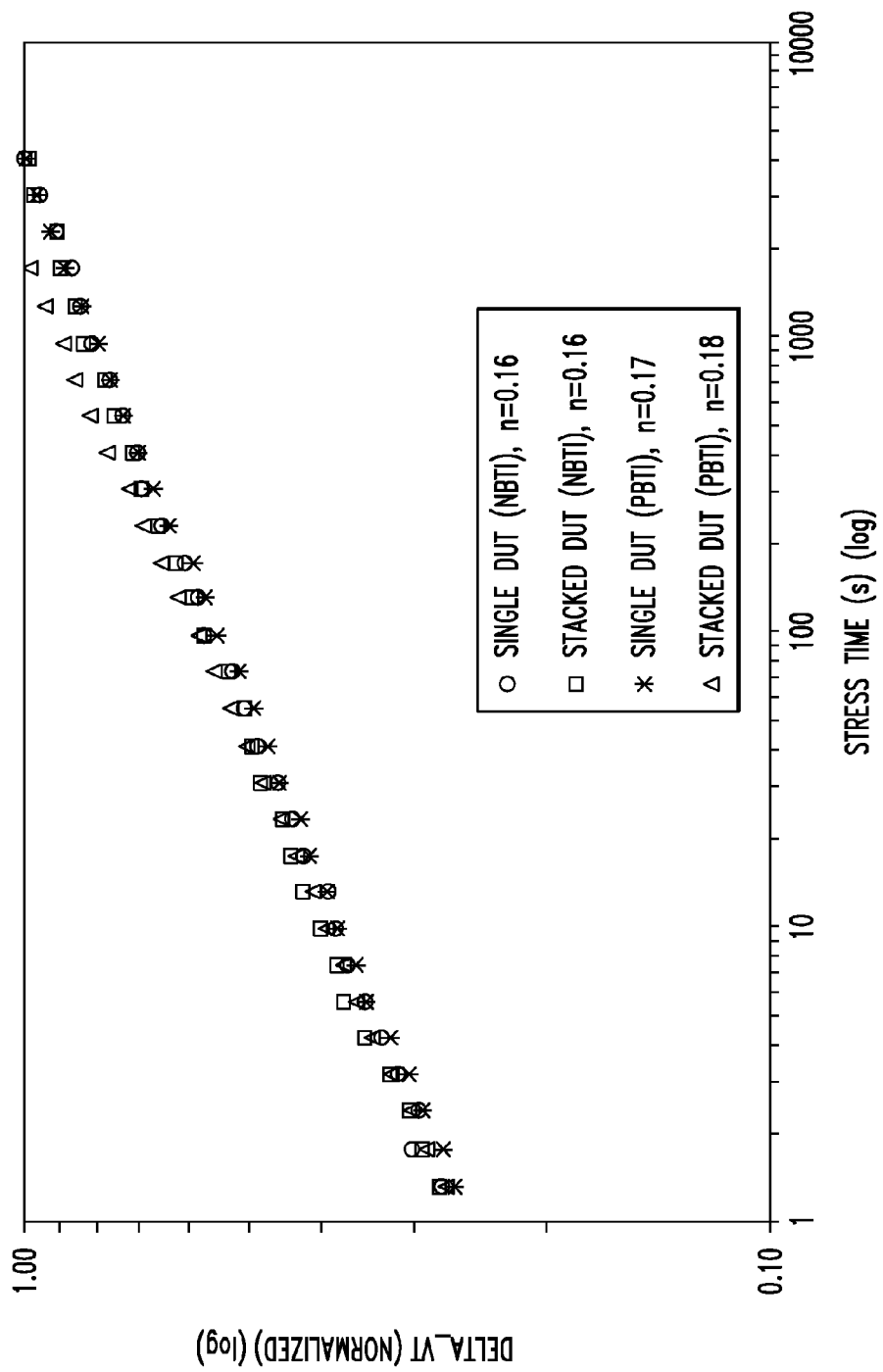
FIG. 15 shows exemplary data for stress time vs. Vt degradation.
Figure 16:
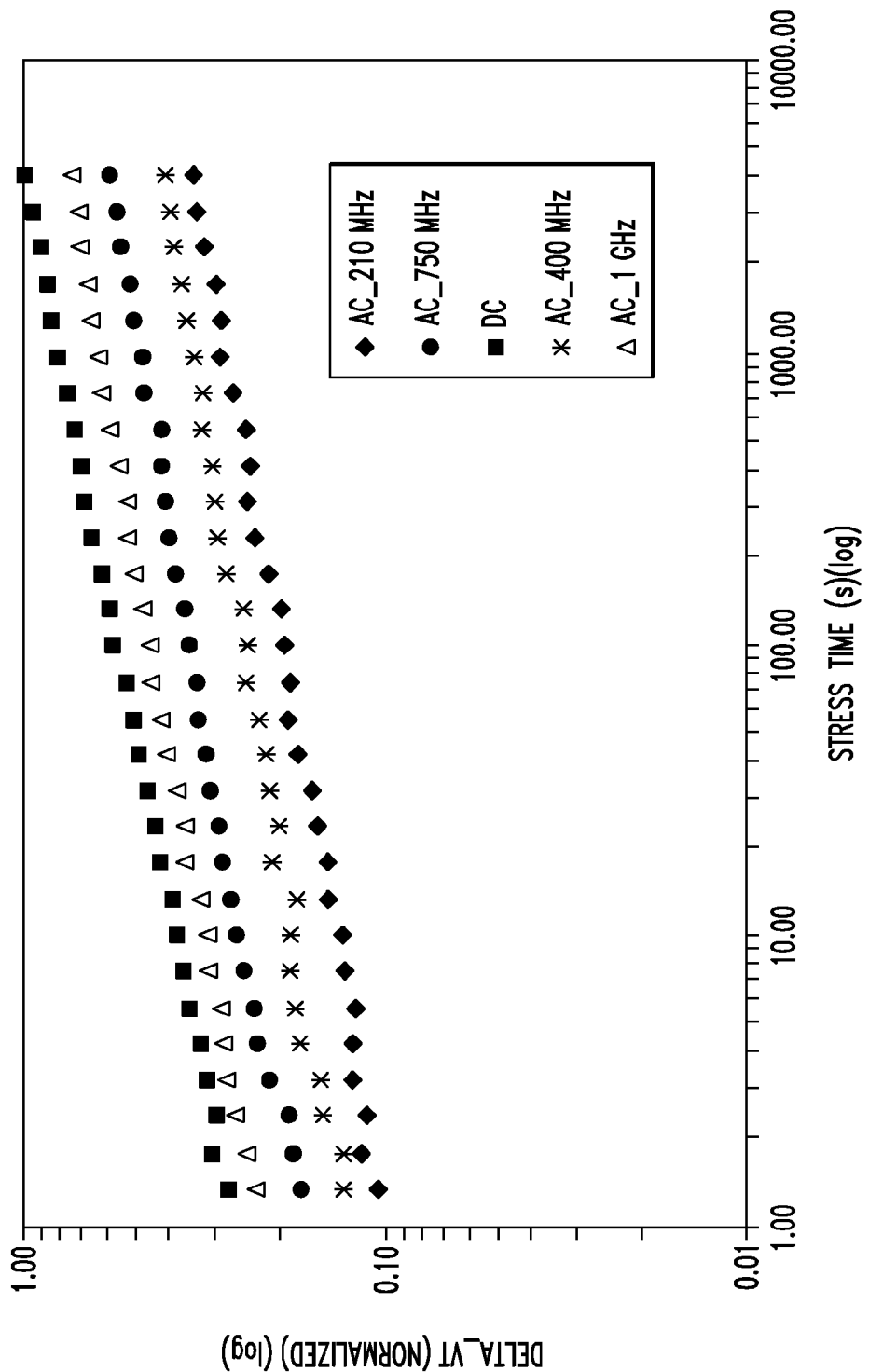
FIG. 16 shows an exemplary comparison between DC and AC NBTI stress.

FIG. 14 shows the RO frequency degradation for single and stacked DUT structures due to NBTI or PBTI. FIG. 15 shows the ΔVt mapped using the frequency degradation and pre-characterization table. Each data point for NBTI (PBTI) stress is normalized to the data value for the single DUT at a stress time=4000 s. As can be seen in FIGS. 14 and 15, the difference in ΔVt between the RO with single DUT and the stacked DUT for each BTI stress is very small even when the difference in frequency degradation value is noticeable between them, which tends to confirm the correctness of the on-chip Vt degradation characterization scheme as described herein. The frequency degradation and ΔVt follow the time-power law with the exponent (n) (the slope in the log-log graph in FIGS. 14 and 15) between 0.16 and 0.18, which is consistent with previously reported data. FIG. 16 also shows the Vt degradation under DC and AC NBTI stress with various frequencies. It can be seen that AC stress causes a smaller Vt degradation than DC stress.

Given the discussion thus far, it will be appreciated that, in general terms, an exemplary ring oscillator circuit for measurement of at least one of negative bias temperature instability effect and positive bias temperature instability effect, according to an aspect of the invention, includes a ring oscillator comprising first and second rails 518, 520, and an odd number of repeating circuit structures such as 500. The odd number is at least three, and each of the repeating circuit structures includes an input terminal 514 and an output terminal 516. Each of the structures also includes a first p-type transistor 502 having a gate, a first drain-source terminal coupled to the first rail 518, and a second drain source terminal selectively coupled to the output terminal 516. Each of the structures further includes a first n-type transistor 508 having a gate, a first drain-source terminal coupled to the second rail 520, and a second drain source terminal selectively coupled to the output terminal 516. Also included in each repeating circuit structure 500 is repeating-circuit-structure control circuitry (a non-limiting example of which includes devices 504, 506, 510, 512, interconnected as shown and discussed elsewhere). Each of the repeating circuit structures has its output terminal 516 connected to the input terminal 514 of an immediately adjacent one of the repeating circuit structures.

The ring oscillator circuit also includes a voltage supply and control block 550 coupled to the ring oscillator and configured to cooperate with the repeating-circuit-structure control circuitry such that:

During a negative bias temperature instability effect direct current stress mode, as seen, for example, in FIG. 6, the gates of the first n-type transistors 508 are grounded to turn them off, a stress voltage differential (as described above, can be, for example, −VN (VN+VDD=desired Vstr) applied to gate with nominal VDD supply voltage, or the gate input can be tied to GND while elevating the supply voltage to Vstr) is applied between the first rail 518 and the gates of the first p-type transistors 502 to stress them, and the second rail 520 is grounded.

During a positive bias temperature instability effect direct current stress mode, as seen, for example, in FIG. 7, the gates of the first p-type transistors 502 are held at a nominal supply voltage to turn them off, a stress voltage differential is applied between the second rail 520 and the gates of the first n-type transistors 508 to stress them (e.g., VDD_stress at gate and second rail grounded), and the first rail 518 is held at the nominal supply voltage.

During a measurement mode, as seen, for example, in FIG. 8, the nominal supply voltage is applied to the first rail 518 and a ground to the second rail 520, and the second drain source terminals of the first n-type transistors 508 and the first p-type transistors 502 are coupled to the output terminals 516, such that each of the repeating circuit structures functions as an inverter.

In some instances, the ring oscillator further includes a p-stress enable terminal coupled to the gates of the first p-type transistors 502, an n-stress enable terminal coupled to the gates of the first n-type transistors 508, a p-bias terminal (VPbias), and an n-bias terminal (VNbias). Furthermore, in some cases, the repeating-circuit-structure control circuitry includes, for each of the repeating circuit structures, a second p-type transistor 504 having a gate coupled to the input terminal, a first drain-source terminal coupled to the second drain source terminal of the first p-type transistor 502, and a second drain source terminal coupled to the output terminal 516; a third p-type transistor 510 having a gate coupled to the p-bias terminal, a first drain-source terminal coupled to the first rail 518, and a second drain source terminal coupled to the output terminal 516; a second n-type transistor 506 having a gate coupled to the input terminal 514, a first drain-source terminal coupled to the second drain source terminal of the first n-type transistor 508, and a second drain source terminal coupled to the output terminal 516; and a third n-type transistor 512 having a gate coupled to the n-bias terminal, a first drain-source terminal coupled to the second rail 520, and a second drain source terminal coupled to the output terminal 516.

In one or more embodiments, the voltage supply and control block 550 is further configured to apply:

During the negative bias temperature instability effect direct current stress mode, as seen, for example, in FIG. 6, the ground to the p-bias and n-bias terminals (this has the effect of causing the nominal supply voltage to appear at the input terminal 514 of a first one of the repeating circuit structures, since the last stage output is pre-charged to VDD due to the conditioning of the p-bias and n-bias terminals).

During the positive bias temperature instability effect direct current stress mode, as seen, for example, in FIG. 7, the nominal supply voltage to the p-bias and n-bias terminals (this has the effect of causing the ground potential to appear at the input terminal 514 of a first one of the repeating circuit structures, since the last stage output is grounded due to the conditioning of the p-bias and n-bias terminals).

It should be noted that in one or more embodiments, the voltage supply and control block 550 only applies PSTR_EN, NSTR_EN, VPbias, and VNbias at the appropriate times.

With reference to the example of FIG. 11B, in some cases, the voltage supply and control block 550 is further configured such that:

During a negative bias temperature instability effect alternating current stress mode, the gates of the first n-type transistors 508 are grounded to turn them off, a pulsed AC stress voltage differential is applied between the first rail 518 and the gates of the first p-type transistors 502 to stress them, and the second rail 520 is grounded.

During a positive bias temperature instability effect alternating current stress mode, the gates of the first p-type transistors 502 are held at a nominal supply voltage to turn them off, a pulsed AC stress voltage differential is applied between the second rail 520 and the gates of the first n-type transistors 508 to stress them, and the first rail 518 is held at the nominal supply voltage.

It should be noted that these steps can be carried out under the control of the block 550, which can be implemented using a variety of techniques as discussed elsewhere herein (e.g., custom hardware, software running on one or more hardware processors, and so on).

Note also that in one or more embodiments, the AC stress control signals are the same as the DC stress control signals except that the input to the DUT is AC not DC.

Furthermore, given the discussion thus far, it will be appreciated that, in general terms, an exemplary method includes the steps of providing a ring oscillator such as that described elsewhere herein; and, during a negative bias temperature instability effect direct current stress mode, as described, for example, with respect to FIG. 6, grounding the gates of the first n-type transistors 508 to turn them off, applying a stress voltage differential between the first rail 518 and the gates of the first p-type transistors 502 to stress them, and grounding the second rail 520. The method also includes the steps of, during a positive bias temperature instability effect direct current stress mode, such as described, for example, with respect to FIG. 7, holding the gates of the first p-type transistors 502 at a nominal supply voltage to turn them off, applying a stress voltage differential between the second rail 520 and the gates of the first n-type transistors 508 to stress them, and holding the first rail 518 at the nominal supply voltage; and during a measurement mode, such as described, for example, with respect to FIG. 8, applying the nominal supply voltage to the first rail 518 and a ground to the second rail 520, and coupling the second drain source terminals of the first n-type transistors 508 and the first p-type transistors 502 to the output terminals 516, such that each of the repeating circuit structures functions as an inverter.

Further optional steps may be carried out, for example, in cases when the ring oscillator includes the aforementioned p-stress enable terminal, n-stress enable terminal, p-bias terminal, n-bias terminal, second p-type transistor 504, third p-type transistor 510, second n-type transistor 506, and third n-type transistor 512. Such steps can include, for example, during the negative bias temperature instability effect direct current stress mode, as described, for example, with respect to FIG. 6, applying the ground to the p-bias and n-bias terminals; and, during the positive bias temperature instability effect direct current stress mode, as described, for example, with respect to FIG. 7, applying the nominal supply voltage to the p-bias and n-bias terminals.

With reference to the example of FIG. 11B, in some instances, further steps include, during a negative bias temperature instability effect alternating current stress mode, grounding the gates of the first n-type transistors 508 to turn them off, applying a pulsed AC stress voltage differential between the first rail 518 and the gates of the first p-type transistors 502 to stress them, and grounding the second rail 520; and, during a positive bias temperature instability effect alternating current stress mode, holding the gates of the first p-type transistors 502 at a nominal supply voltage to turn them off, applying a pulsed AC stress voltage differential between the second rail 520 and the gates of the first n-type transistors 508 to stress them, and holding the first rail 518 at the nominal supply voltage.

Referring now to the example of FIG. 10, in some instances, an additional step 1001 includes, prior to the positive bias temperature instability effect direct current stress mode, sweeping voltage at the n-stress enable terminal for a predetermined range of interest (in some instances, centered at the nominal supply voltage) and recording corresponding ring oscillator frequency under pre-stress conditions. Note, however, that in another approach, the sweep is only in one direction. In this case, it is starting from the nominal supply voltage and going down, so it is not really centered at the nominal supply voltage. This latter approach may be more practical in at least some instances because circuits are not expected to get faster after the stress but rather to degrade from the BTI, and thus the region of importance is from the nominal supply voltage down (to mimic the conditions expected after stress).

Further steps include, as at 1003, subsequent to the positive bias temperature instability effect direct current stress mode, maintaining the n-stress enable terminal at the nominal supply voltage and recording corresponding ring oscillator frequency under post-stress conditions (required repetitions can be carried out as needed as noted at 1004); and, as at 1005, determining a value of threshold voltage degradation due to the positive bias temperature instability effect by subtracting the nominal supply voltage from that value of the swept voltage at the n-stress enable terminal which corresponds to a value of the corresponding ring oscillator frequency under pre-stress conditions that matches the ring oscillator frequency under post-stress conditions.

Furthermore, for the analogous case of stressing the PDUTs, analogously to 1001, prior to the negative bias temperature instability effect direct current stress mode, sweep voltage at the p-stress enable terminal for a predetermined range of interest (in some instances, centered at the nominal ground voltage) (also see note above regarding centering in the NDUT case; similar considerations apply for the PDUT case such that the nominal ground voltage may be an endpoint of the range rather than a center in some cases) and record corresponding ring oscillator frequency under pre-stress conditions. Analogously to 1003, subsequent to the negative bias temperature instability effect direct current stress mode, maintain the p-stress enable terminal at ground and record corresponding ring oscillator frequency under post-stress conditions (again repeating as needed analogously to 1004), and, analogous to 1005, determine a value of threshold voltage degradation due to the negative bias temperature instability effect by subtracting the nominal ground voltage from that value of the swept voltage at the p-stress enable terminal which corresponds to a value of the corresponding ring oscillator frequency under pre-stress conditions that matches the ring oscillator frequency under post-stress conditions.

One or more exemplary methods as described herein can be used in the fabrication (especially in test aspects) of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor. Note that one or more embodiments are particularly useful where adequate life of circuitry is important and thus one or more embodiments may be particularly useful in connection with higher-end applications.

Figure 17:
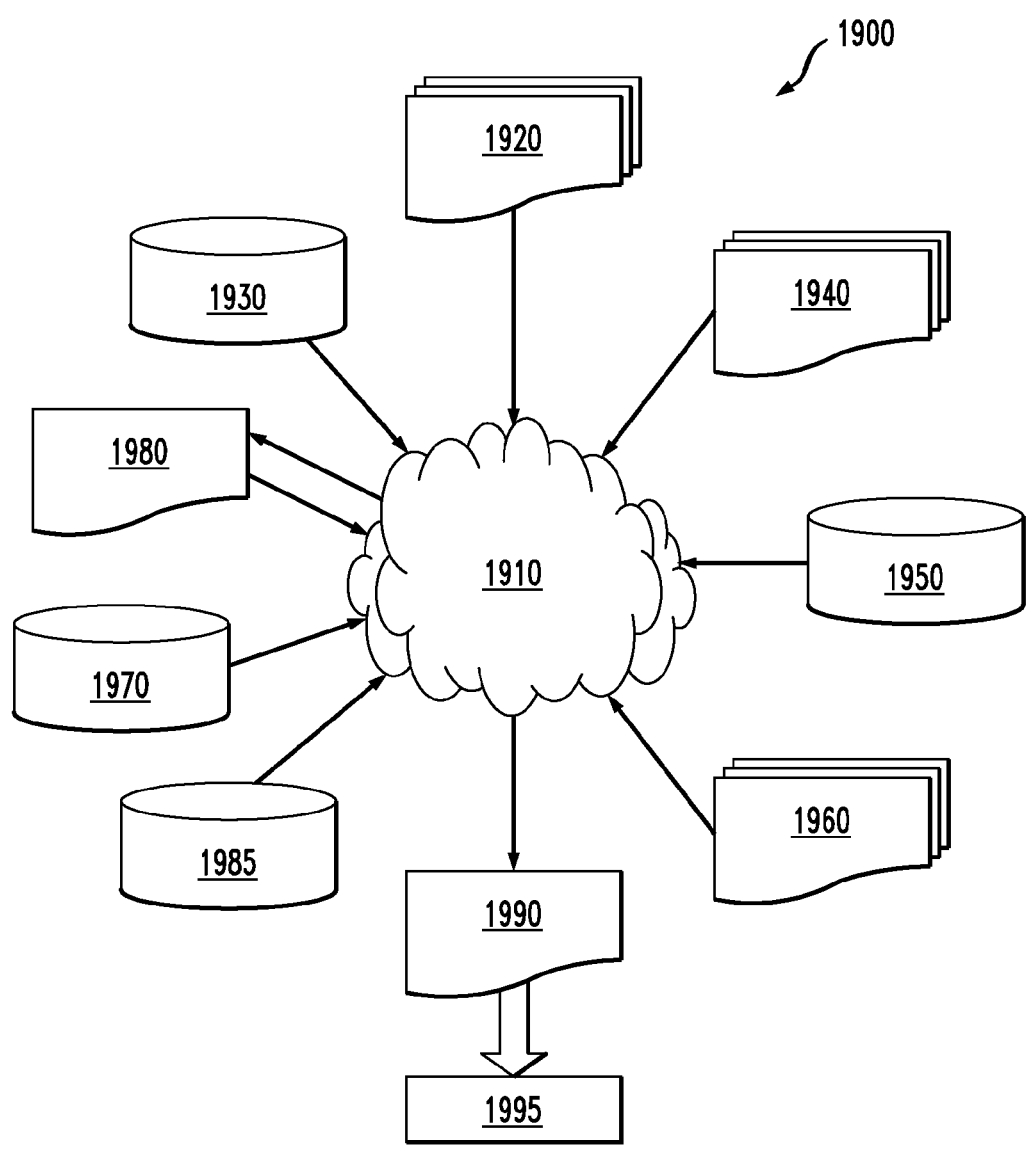
FIG. 17 is a flow diagram of a design process used in semiconductor design, manufacture, and/or test.

FIG. 17 shows a block diagram of an exemplary design flow 1900 used for example, in semiconductor IC logic design, simulation, test, layout, and manufacture. Design flow 1900 includes processes, machines and/or mechanisms for processing design structures or devices to generate logically or otherwise functionally equivalent representations of the design structures and/or devices described above and shown in FIGS. 5-9, 11B, 12, and 13. The design structures processed and/or generated by design flow 1900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1900 may vary depending on the type of representation being designed. For example, a design flow 1900 for building an application specific IC (ASIC) may differ from a design flow 1900 for designing a standard component or from a design flow 1900 for instantiating the design into a programmable array, for example a programmable gate array (PGA) or a field programmable gate array (FPGA) offered by Altera® Inc. or Xilinx® Inc.

FIG. 17 illustrates multiple such design structures including an input design structure 1920 that is preferably processed by a design process 1910. Design structure 1920 may be a logical simulation design structure generated and processed by design process 1910 to produce a logically equivalent functional representation of a hardware device. Design structure 1920 may also or alternatively comprise data and/or program instructions that when processed by design process 1910, generate a functional representation of the physical structure of a hardware device. Whether representing functional and/or structural design features, design structure 1920 may be generated using electronic computer-aided design (ECAD) such as implemented by a core developer/designer. When encoded on a machine-readable data transmission, gate array, or storage medium, design structure 1920 may be accessed and processed by one or more hardware and/or software modules within design process 1910 to simulate or otherwise functionally represent an electronic component, circuit, electronic or logic module, apparatus, device, or system such as those shown in FIGS. 5-9, 11B, 12, and 13. As such, design structure 1920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1910 preferably employs and incorporates hardware and/or software modules for synthesizing, translating, or otherwise processing a design/simulation functional equivalent of the components, circuits, devices, or logic structures shown in FIGS. 5-9, 11B, 12, and 13 to generate a Netlist 1980 which may contain design structures such as design structure 1920. Netlist 1980 may comprise, for example, compiled or otherwise processed data structures representing a list of wires, discrete components, logic gates, control circuits, I/O devices, models, etc. that describes the connections to other elements and circuits in an integrated circuit design. Netlist 1980 may be synthesized using an iterative process in which netlist 1980 is resynthesized one or more times depending on design specifications and parameters for the device. As with other design structure types described herein, netlist 1980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 1910 may include hardware and software modules for processing a variety of input data structure types including Netlist 1980. Such data structure types may reside, for example, within library elements 1930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1940, characterization data 1950, verification data 1960, design rules 1970, and test data files 1985 which may include input test patterns, output test results, and other testing information. Design process 1910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1910 without deviating from the scope and spirit of the invention. Design process 1910 may also include modules for performing standard circuit design processes such as timing analysis, verification, design rule checking, place and route operations, etc.

Design process 1910 employs and incorporates logic and physical design tools such as HDL compilers and simulation model build tools to process design structure 1920 together with some or all of the depicted supporting data structures along with any additional mechanical design or data (if applicable), to generate a second design structure 1990. Design structure 1990 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 1920, design structure 1990 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 5-9, 11B, 12, and 13. In one embodiment, design structure 1990 may comprise a compiled, executable HDL simulation model that functionally simulates the devices shown in FIGS. 5-9, 11B, 12, and 13.

Design structure 1990 may also employ a data format used for the exchange of layout data of integrated circuits and/or symbolic data format (e.g. information stored in a GDSII (GDS2), GL1, OASIS, map files, or any other suitable format for storing such design data structures). Design structure 1990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 5-9, 11B, 12, and 13. Design structure 1990 may then proceed to a stage 1995 where, for example, design structure 1990: proceeds to tape-out, is released to manufacturing, is released to a mask house, is sent to another design house, is sent back to the customer, etc.

Exemplary System and Article of Manufacture Details

As will be appreciated by one skilled in the art, aspects of the present invention may be embodied as a system, method or computer program product (for example, block 550 can, in some instances, be implemented by software running on at least one processor controlling a voltage supply). Furthermore, aspects of the present invention may take the form of a computer program product embodied in one or more computer readable medium(s) having computer readable program code embodied thereon.

Portions of one or more embodiments of the invention can be implemented in the form of an apparatus including a memory and at least one processor that is coupled to the memory and operative to perform or otherwise facilitate exemplary method steps.

Figure 13:
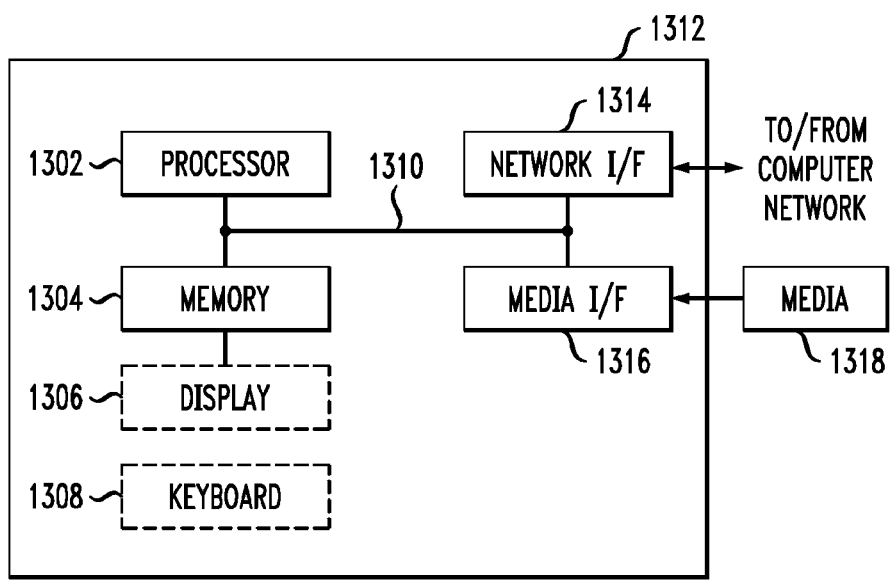
FIG. 13 depicts a computer system that may be useful in implementing one or more aspects and/or elements of the invention.

One or more embodiments can make use of software running on a general purpose computer or workstation. With reference to FIG. 13, such an implementation might employ, for example, a processor 1302, a memory 1304, and an input/output interface formed, for example, by a display 1306 and a keyboard 1308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1302, memory 1304, and input/output interface such as display 1306 and keyboard 1308 can be interconnected, for example, via bus 1310 as part of a data processing unit 1312. Suitable interconnections, for example via bus 1310, can also be provided to a network interface 1314, such as a network card, which can be provided to interface with a computer network, and to a media interface 1316, such as a diskette or CD-ROM drive, which can be provided to interface with media 1318. In some cases, a voltage supply can be controlled over the network or can be directly coupled to unit 1312.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1302 coupled directly or indirectly to memory elements 1304 through a system bus 1310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1308, displays 1306, pointing devices, and the like) can be coupled to the system either directly (such as via bus 1310) or through intervening I/O controllers (omitted for clarity).

Network adapters such as network interface 1314 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1312 as shown in FIG. 13) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 1318 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium to control the application of signals to the ring oscillator. The method steps can then be carried out using the distinct software modules and/or sub-modules of the system, as described above, executing on one or more hardware processors 1302. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A ring oscillator circuit for measurement of at least one of negative bias temperature instability effect and positive bias temperature instability effect, said circuit comprising:

a ring oscillator comprising first and second rails, and an odd number of repeating circuit structures, said odd number being at least three, each of said repeating circuit structures comprising:

an input terminal and an output terminal;

a first p-type transistor having a gate, a first drain-source terminal coupled to said first rail, and a second drain source terminal selectively coupled to said output terminal;

a first n-type transistor having a gate, a first drain-source terminal coupled to said second rail, and a second drain source terminal selectively coupled to said output terminal; and repeating-circuit-structure control circuitry;

wherein each of said repeating circuit structures has its output terminal connected to said input terminal of an immediately adjacent one of said repeating circuit structures; and a voltage supply and control block coupled to said ring oscillator and configured to cooperate with said repeating-circuit-structure control circuitry such that:

during a negative bias temperature instability effect direct current stress mode, said gates of said first n-type transistors are grounded to turn them off, a stress voltage differential is applied between said first rail and said gates of said first p-type transistors to stress them, and said second rail is grounded;

during a positive bias temperature instability effect direct current stress mode, said gates of said first p-type transistors are held at a nominal supply voltage to turn them off, a stress voltage differential is applied between said second rail and said gates of said first n-type transistors to stress them, and said first rail is held at said nominal supply voltage; and during a measurement mode, said nominal supply voltage is applied to said first rail and a ground to said second rail, and said second drain source terminals of said first n-type transistors and said first p-type transistors are coupled to said output terminals, such that each of said repeating circuit structures functions as an inverter.

2. The circuit of claim 1, wherein:

said ring oscillator further comprises a p-stress enable terminal coupled to said gates of said first p-type transistors, an n-stress enable terminal coupled to said gates of said first n-type transistors, a p-bias terminal, and an n-bias terminal;

said repeating-circuit-structure control circuitry comprises, for each of said repeating circuit structures:

a second p-type transistor having a gate coupled to said input terminal, a first drain-source terminal coupled to said second drain source terminal of said first p-type transistor, and a second drain source terminal coupled to said output terminal;

a third p-type transistor having a gate coupled to said p-bias terminal, a first drain-source terminal coupled to said first rail, and a second drain source terminal coupled to said output terminal;

a second n-type transistor having a gate coupled to said input terminal, a first drain-source terminal coupled to said second drain source terminal of said first n-type transistor, and a second drain source terminal coupled to said output terminal; and a third n-type transistor having a gate coupled to said n-bias terminal, a first drain-source terminal coupled to said second rail, and a second drain source terminal coupled to said output terminal; and said voltage supply and control block is further configured to apply:

during said negative bias temperature instability effect direct current stress mode, said ground to said p-bias and n-bias terminals;

during said positive bias temperature instability effect direct current stress mode, said nominal supply voltage to said p-bias and n-bias terminals.

3. The circuit of claim 2, wherein said voltage supply and control block is further configured such that:

during a negative bias temperature instability effect alternating current stress mode, said gates of said first n-type transistors are grounded to turn them off, a pulsed AC stress voltage differential is applied between said first rail and said gates of said first p-type transistors to stress them, and said second rail is grounded; and during a positive bias temperature instability effect alternating current stress mode, said gates of said first p-type transistors are held at a nominal supply voltage to turn them off, a pulsed AC stress voltage differential is applied between said second rail and said gates of said first n-type transistors to stress them, and said first rail is held at said nominal supply voltage.

4. The circuit of claim 3, wherein said voltage supply and control block is implemented in hardware.

5. The circuit of claim 3, wherein said voltage supply and control block is implemented at least partially in software, embodied in a computer readable storage medium, executing on at least one hardware processor.

6. The circuit of claim 3, further comprising:

a multiplexer having a first input configured for connection to an on-chip voltage controlled oscillator and a second input configured for connection to an external stress, and having an output;

a first divider having an input coupled to said output of said multiplexer and an output configured for interconnection with an oscilloscope;

a level converter coupled to said output of said multiplexer and an output coupled to said ring oscillator; and a second divider having an input coupled to said output of said multiplexer and an output configured for interconnection with an oscilloscope.

7. A method comprising the steps of:

providing a ring oscillator comprising first and second rails, and an odd number of repeating circuit structures, said odd number being at least three, each of said repeating circuit structures comprising:

an input terminal and an output terminal;

a first p-type transistor having a gate, a first drain-source terminal coupled to said first rail, and a second drain source terminal selectively coupled to said output terminal; and a first n-type transistor having a gate, a first drain-source terminal coupled to said second rail, and a second drain source terminal selectively coupled to said output terminal;

wherein each of said repeating circuit structures has its output terminal connected to said input terminal of an immediately adjacent one of said repeating circuit structures;

during a negative bias temperature instability effect direct current stress mode, grounding said gates of said first n-type transistors to turn them off, applying a stress voltage differential between said first rail and said gates of said first p-type transistors to stress them, and grounding said second rail;

during a positive bias temperature instability effect direct current stress mode, holding said gates of said first p-type transistors at a nominal supply voltage to turn them off, applying a stress voltage differential between said second rail and said gates of said first n-type transistors to stress them, and holding said first rail at said nominal supply voltage; and during a measurement mode, applying said nominal supply voltage to said first rail and a ground to said second rail, and coupling said second drain source terminals of said first n-type transistors and said first p-type transistors to said output terminals, such that each of said repeating circuit structures functions as an inverter.

8. The method of claim 7, wherein:

said ring oscillator further comprises:

a p-stress enable terminal coupled to said gates of said first p-type transistors, an n-stress enable terminal coupled to said gates of said first n-type transistors, a p-bias terminal, and an n-bias terminal;

for each of said repeating circuit structures:

a second p-type transistor having a gate coupled to said input terminal, a first drain-source terminal coupled to said second drain source terminal of said first p-type transistor, and a second drain source terminal coupled to said output terminal;

a third p-type transistor having a gate coupled to said p-bias terminal, a first drain-source terminal coupled to said first rail, and a second drain source terminal coupled to said output terminal;

a second n-type transistor having a gate coupled to said input terminal, a first drain-source terminal coupled to said second drain source terminal of said first n-type transistor, and a second drain source terminal coupled to said output terminal; and a third n-type transistor having a gate coupled to said n-bias terminal, a first drain-source terminal coupled to said second rail, and a second drain source terminal coupled to said output terminal;

further comprising:
during said negative bias temperature instability effect direct current stress mode, applying said ground to said p-bias and n-bias terminals;
during said positive bias temperature instability effect direct current stress mode, applying said nominal supply voltage to said p-bias and n-bias terminals.

9. The method of claim 8, further comprising:
during a negative bias temperature instability effect alternating current stress mode, grounding said gates of said first n-type transistors to turn them off, applying a pulsed AC stress voltage differential between said first rail and said gates of said first p-type transistors to stress them, and grounding said second rail; and
during a positive bias temperature instability effect alternating current stress mode, holding said gates of said first p-type transistors at a nominal supply voltage to turn them off, applying a pulsed AC stress voltage differential between said second rail and said gates of said first n-type transistors to stress them, and holding said first rail at said nominal supply voltage.

10. The method of claim 8, further comprising:
prior to said positive bias temperature instability effect direct current stress mode, sweeping voltage at said n-stress enable terminal for a predetermined range of interest and recording corresponding ring oscillator frequency under pre-stress conditions;
subsequent to said positive bias temperature instability effect direct current stress mode, maintaining said n-stress enable terminal at said nominal supply voltage and recording corresponding ring oscillator frequency under post-stress conditions; and
determining a value of threshold voltage degradation due to said positive bias temperature instability effect by subtracting said nominal supply voltage from that value of said swept voltage at said n-stress enable terminal which corresponds to a value of said corresponding ring oscillator frequency under pre-stress conditions that matches said ring oscillator frequency under post-stress conditions.

11. The method of claim 8, further comprising:
prior to said negative bias temperature instability effect direct current stress mode, sweeping voltage at said p-stress enable terminal for a predetermined range of interest and recording corresponding ring oscillator frequency under pre-stress conditions;
subsequent to said negative bias temperature instability effect direct current stress mode, maintaining said p-stress enable terminal at ground and recording corresponding ring oscillator frequency under post-stress conditions; and
determining a value of threshold voltage degradation due to said negative bias temperature instability effect by subtracting said ground from that value of said swept voltage at said p-stress enable terminal which corresponds to a value of said corresponding ring oscillator frequency under pre-stress conditions that matches said ring oscillator frequency under post-stress conditions.

12. A design structure tangibly embodied in a machine readable medium for designing, manufacturing, or testing an integrated circuit, said design structure comprising a ring oscillator circuit for measurement of at least one of negative bias temperature instability effect and positive bias temperature instability effect, said circuit comprising:
a ring oscillator comprising first and second rails, and an odd number of repeating circuit structures, said odd number being at least three, each of said repeating circuit structures comprising:
an input terminal and an output terminal;
a first p-type transistor having a gate, a first drain-source terminal coupled to said first rail, and a second drain source terminal selectively coupled to said output terminal;
a first n-type transistor having a gate, a first drain-source terminal coupled to said second rail, and a second drain source terminal selectively coupled to said output terminal; and
repeating-circuit-structure control circuitry;
wherein each of said repeating circuit structures has its output terminal connected to said input terminal of an immediately adjacent one of said repeating circuit structures; and
a voltage supply and control block coupled to said ring oscillator and configured to cooperate with said repeating-circuit-structure control circuitry such that:
during a negative bias temperature instability effect direct current stress mode, said gates of said first n-type transistors are grounded to turn them off, a stress voltage differential is applied between said first rail and said gates of said first p-type transistors to stress them, and said second rail is grounded;
during a positive bias temperature instability effect direct current stress mode, said gates of said first p-type transistors are held at a nominal supply voltage to turn them off, a stress voltage differential is applied between said second rail and said gates of said first n-type transistors to stress them, and said first rail is held at said nominal supply voltage; and
during a measurement mode, said nominal supply voltage is applied to said first rail and a ground to said second rail, and said second drain source terminals of said first n-type transistors and said first p-type transistors are coupled to said output terminals, such that each of said repeating circuit structures functions as an inverter.

13. The design structure of claim 12, wherein said circuit further comprises:
said ring oscillator further comprises a p-stress enable terminal coupled to said gates of said first p-type transistors, an n-stress enable terminal coupled to said gates of said first n-type transistors, a p-bias terminal, and an n-bias terminal;
said repeating-circuit-structure control circuitry comprises, for each of said repeating circuit structures:
a second p-type transistor having a gate coupled to said input terminal, a first drain-source terminal coupled to said second drain source terminal of said first p-type transistor, and a second drain source terminal coupled to said output terminal;
a third p-type transistor having a gate coupled to said p-bias terminal, a first drain-source terminal coupled to said first rail, and a second drain source terminal coupled to said output terminal;
a second n-type transistor having a gate coupled to said input terminal, a first drain-source terminal coupled to said second drain source terminal of said first n-type transistor, and a second drain source terminal coupled to said output terminal; and a third n-type transistor having a gate coupled to said n-bias terminal, a first drain-source terminal coupled to said second rail, and a second drain source terminal coupled to said output terminal; and said voltage supply and control block is further configured to apply:

during said negative bias temperature instability effect direct current stress mode, said ground to said p-bias and n-bias terminals;

during said positive bias temperature instability effect direct current stress mode, said nominal supply voltage to said p-bias and n-bias terminals.

14. The design structure of claim 13, wherein said voltage supply and control block of said circuit is further configured such that:

during a negative bias temperature instability effect alternating current stress mode, said gates of said first n-type transistors are grounded to turn them off, a pulsed AC stress voltage differential is applied between said first rail and said gates of said first p-type transistors to stress them, and said second rail is grounded; and during a positive bias temperature instability effect alternating current stress mode, said gates of said first p-type transistors are held at a nominal supply voltage to turn them off, a pulsed AC stress voltage differential is applied between said second rail and said gates of said first n-type transistors to stress them, and said first rail is held at said nominal supply voltage.

15. The design structure of claim 14, wherein said voltage supply and control block of said circuit is implemented in hardware.

16. The design structure of claim 14, wherein said circuit further comprises:

a multiplexer having a first input configured for connection to an on-chip voltage controlled oscillator and a second input configured for connection to an external stress, and having an output;

a first divider having an input coupled to said output of said multiplexer and an output configured for interconnection with an oscilloscope;

a level converter coupled to said output of said multiplexer and an output coupled to said ring oscillator; and a second divider having an input coupled to said output of said multiplexer and an output configured for interconnection with an oscilloscope.

\* \* \* \* \*